United States Patent

Narahari et al.

[11] Patent Number: 5,892,972
[45] Date of Patent: Apr. 6, 1999

[54] METHOD OF CONSTRUCTING A PLUG AND PLAY COMPATIBLE BUS CARD WHICH ALLOWS FOR MASS PRODUCTION OF THE BUS CARD

[75] Inventors: Sharath C. Narahari, San Jose; Nagesh Sreedhara, Milpitas; Ramchandra Nadkarni, Fremont; Shahin Hedayat, San Ramon, all of Calif.

[73] Assignee: Cirrus Logic, Inc., Fremont, Calif.

[21] Appl. No.: 877,207

[22] Filed: Jun. 17, 1997

Related U.S. Application Data

[63] Continuation of Ser. No. 477,021, Jun. 7, 1995, abandoned.

[51] Int. Cl.$^6$ .................................................. G06F 15/177
[52] U.S. Cl. ........................... 395/828; 395/830; 395/284
[58] Field of Search .................................... 395/828–834, 395/281–284, 651–653

[56] References Cited

U.S. PATENT DOCUMENTS

| | | | |
|---|---|---|---|
| 4,773,005 | 9/1988 | Sullivan | 395/829 |
| 5,274,771 | 12/1993 | Hamilton et al. | 395/829 |
| 5,317,693 | 5/1994 | Cuenod et al. | 395/829 |
| 5,335,329 | 8/1994 | Cox et al. | 395/282 |
| 5,371,892 | 12/1994 | Petersen et al. | 395/700 |
| 5,420,987 | 5/1995 | Reid et al. | 395/830 |
| 5,428,748 | 6/1995 | Davidson et al. | 395/829 |
| 5,491,804 | 2/1996 | Heath et al. | 395/827 |
| 5,517,646 | 5/1996 | Piccirillo et al. | 395/700 |
| 5,522,086 | 5/1996 | Burton et al. | 395/829 |
| 5,530,895 | 6/1996 | Enstrom | 395/829 |
| 5,537,654 | 7/1996 | Bedingfield et al. | 395/834 |
| 5,559,965 | 9/1996 | Oztaskin et al. | 395/284 |
| 5,619,724 | 4/1997 | Moore | 395/829 |
| 5,628,027 | 5/1997 | Belmont | 395/821 |

Primary Examiner—Ayaz R. Sheikh
Assistant Examiner—Sumati Lefkowitz
Attorney, Agent, or Firm—David L. Stewart; Lowe Price LeBlanc & Becker; Frank D. Nguyen

[57] ABSTRACT

A system of ISA bus cards compatible with plug and play protocol stores common resource data in a plurality of programmable read only memories which are each installed on the individual bus cards. A random access memory is also provided on each one of the bus cards. In order to comply with the plug and play protocol, each of the random access memories is programmed independently from the read only memories with a unique identification that identifies the individual bus card. The separation of the storage location of the unique identification from the resource data common to all of the bus cards allows for mass production and programming of the read only memories, while still providing the unique identification for each bus card that is required by the plug and play protocol.

3 Claims, 2 Drawing Sheets

METHOD OF CONSTRUCTING A PLUG AND PLAY COMPATIBLE BUS CARD WHICH ALLOWS FOR MASS PRODUCTION OF THE BUS CARD

This application is a continuation of application Ser. No. 08/477,021 filed Jun. 7, 1995, now abandoned.

BACKGROUND OF THE INVENTION

1. Technical Field of the Invention

The present invention relates to the field of peripheral communications in digital data systems, and more particularly, to the configuration of bus cards for peripheral devices coupled to a digital data system.

2. Description of Related Art

In digital data systems, such as computer systems, peripheral devices are typically connected to a bus of the system through a bus card. The system bus and the individual bus cards which connect a plurality of peripheral devices to the system, allow the peripheral devices and the system components to communicate with one another. For certain bus architectures, such as the industry standard architecture (ISA) bus, a number of resources must be allocated among the bus cards connected to the bus in order for the system to function properly. These resources include direct memory access channels, interrupt levels, and memory and I/O address spaces.

Since there is no defined mechanism for allocating these resources in the ISA bus architecture, configuration of the bus cards for the ISA bus is typically done with jumpers. The jumpers form a hardwired solution for providing the decode maps for memory and I/O space, and steering the DMA and interrupt signals to different pins on the bus. The resolution of conflicts in resource sharing among the bus cards relies on documentation provided by individual card manufacturers, making the configuration process difficult. Although[]there are other bus architectures that do not have these problems, the popularity of the ISA bus spurred development of a solution to these problems.

The proposed solution to the allocation of resources and conflict resolution in the ISA bus architecture is a protocol known as the "plug and play" protocol. Plug and play software, according to the plug and play specification, optimally allocates system resources between "plug and play" ISA cards and the other devices in the system without user intervention.

The plug and play specification requires each bus card to have a unique identification number (the "ID") in order to automatically configure an ISA bus card. This ID is read by a host processor at the time of power-up or system reset to configure the device. Additionally, to comply with the plug and play standard, the ISA bus card must store its system resources (resource data structure, or "RDS") on the card itself. It is recommended in the plug and play specification that the ID and the system resources (RDS) be stored in serial electrically erasable programmable read only memory (EEPROM).

The requirement that each bus card have a unique ID poses a manufacturing problem in the mass production of plug and play ISA bus cards. In order to efficiently produce the bus cards, the EEPROM's for the individual bus cards need to be programmed simultaneously. However, this is problematical since each card must be programmed with a different ID, although the RDS is the same in each EEPROM.

SUMMARY OF THE INVENTION

There is a need for a method of manufacturing plug and play ISA bus cards that allows the bus cards to be mass produced, but remain compliant with the plug and play protocol.

This and other needs are met by the present invention which provides a method of manufacturing a plurality of bus cards compatible with a plug and play protocol. The method comprises storing common resource data in a plurality of programmable read only memories; installing each of the programmable read only memories on a different one of the bus cards; installing a random access memory on each one of the bus cards; and independently programming each one of the random access memories with a different identification.

The separation of the storage location of the unique identification from the resource data common to all of the bus cards allows for mass production and programming of the read only memories, while still providing the unique identification for each bus card that is required by the plug and play protocol.

Another aspect of the present invention provides a bus card compatible with a plug and play protocol, comprising a first memory that stores system resources; and a second memory that is independently programmable to store a unique identification (ID) for the bus card. This embodiment of the present invention has the advantage of reducing the number of chips on a bus card from that recommended by the plug and play specification, since the recommended serial EEPROM is not necessary for storing the ID. Instead, the ID is stored in the second memory, such as a random access memory, that is normally provided on a bus card. The resource data is stored in the first memory, such as a parallel EEPROM, that is also normally provided on the bus card to store programming for the bus card.

A further aspect of the invention provides a method of retrieving information from a bus card that is compatible with a plug and play protocol, the bus card having a random access memory that stores an identification unique to the bus card, a read only memory that stores resource data common to a plurality of bus cards, and a processor. The method comprises examining an address provided to the processor in a request for information from the bus card. The processor retrieves the identification from the random access memory of the bus card when the address indicates that the information requested is the identification for that bus card. The processor retrieves the resource data from the read only memory of the bus card when the address indicates that the information requested is the resource data. In certain embodiments, the identification is retrieved when the address is within a first portion of a memory space of the bus card, and the resource data is retrieved when the address is not within the first portion of the memory space of the bus card.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
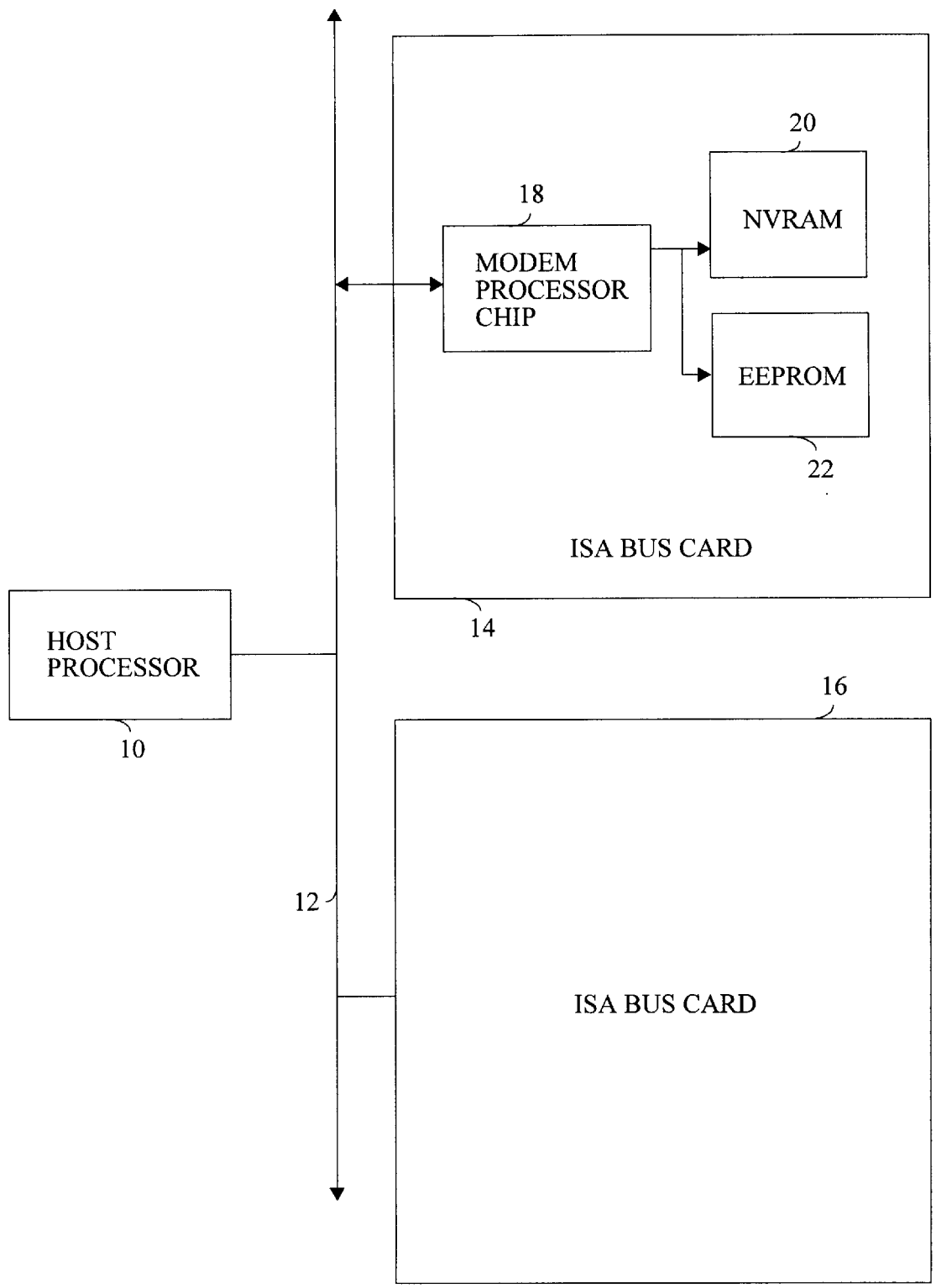
FIG. 1 is a block diagram of a system with a bus card constructed in accordance with the present invention.

FIG. 1 is a block diagram of an exemplary computer system that includes a host processor 10 and an ISA bus 12. The computer system may also have other buses, such as a peripheral component interconnect (PCI) bus (not shown). Further, the computer system normally comprises a number of other components, such as memory, which are not shown in FIG. 1 for purposes of describing the present invention.

A number of bus cards 14, 16 are connected to the ISA bus 12, the bus cards providing connectivity between peripheral devices and the ISA bus 12. The bus cards 14, 16 can be different types of cards, such as a networking card, a modem card, a video card, or other types of cards that communicate over the ISA bus 12. In the following description of the details of the bus card 14, an example of a modem card will be provided. The present invention, however, has general applicability to the other types of cards that are plug and play compatible.

The bus card 14 has a modem processor chip 18 that is connected to a non-volatile random access memory (NVRAM) 20 and a parallel electrically erasable programmable read only memory (EEPROM) 22. The plug and play specification recommends storing the system resources (the RDS) and the unique ID in a serial EEPROM. The present invention, however, reduces the number of chips on the bus card 14 by making use of the NVRAM 20 and the parallel EEPROM 22, both of which are conventionally provided on a bus card in addition to the serial EEPROM recommended by the plug and play specification. The parallel EEPROM is normally used in bus cards to store programmed instructions for the bus card.

According to the present invention, the parallel EEPROM 22 stores the RDS, and the serial NVRAM stores the unique ID for the bus card 14. This separation of the storage of the unique ID from the storage of the RDS allows a plurality of EEPROMs 22 to be programmed in mass production, since the RDS will be the same for each of the bus cards 14 of a particular type, such as a specific type of modem card.

The NVRAM 20 is individually programmed for each bus card 14. When the bus card is a modem card, the programming can be performed either during production testing of the bus card 14, or in the field. The programming of the NVRAM 20 with a unique ID in the exemplary embodiment of a modem card is readily accomplished through what are commonly known as "AT" commands that essentially configure the modem as desired.

Figure 2:
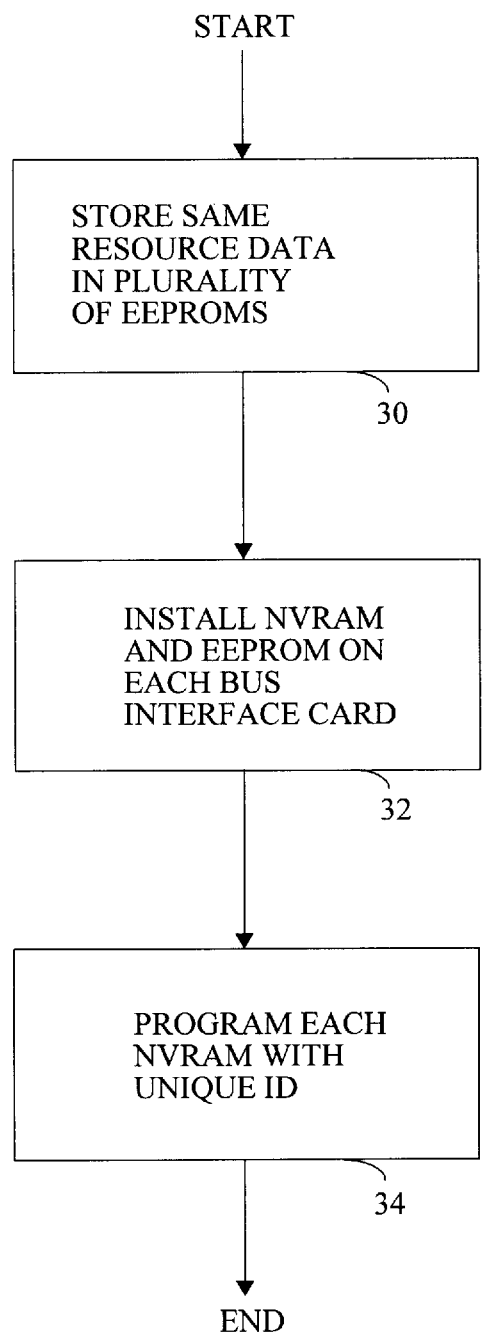
FIG. 2 is a flow chart of a method of manufacturing a bus card in accordance with an embodiment of the present invention.

An embodiment of a method of manufacturing a bus card according to the present invention is provided in FIG. 2. In step 30, the same RDS is simultaneously (or sequentially) stored in a plurality of parallel EEPROMs. This mass programming of the EEPROM's provides a manufacturing advantage over individually programming the EEPROMs each with a unique ID. In step 32, a programmed EEPROM and an NVRAM are installed on a bus card. The NVRAM of each bus card is then provided with a unique ID in step 34. This step can be performed either during production or in the field.

In operation of the system, when the host processor 10 interrupts the modem processor chip 18 to communicate with the bus card 14, the modem processor chip 18 will examine the request for information provided by the host processor 10. Since the ID is defined by the plug and play specification to be 9 bytes long, if the address provided in the request for information by the host processor is within the first 9 bytes, the ID is to be fetched. If the address is not within the first 9 bytes of the memory space of the modem bus card 14, then the RDS is to be fetched. The modem processor chip 18 will therefore either fetch the ID from the NVRAM 20 or the RDS from the parallel EEPROM 22 according to the address. The requested ID or the RDS is then provided onto the ISA bus 12 by the modem processor chip 18.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of manufacturing a plurality of bus cards compatible with a plug and play protocol, comprising:

storing common resource data in a plurality of programmable read only memories;

installing each of the programmable read only memories on a different one of the bus cards;

installing a non-volatile random access memory on each one of the bus cards; and independently programming each one of the random access memories with a different identification.

2. The method of claim 1, wherein the programmable read only memories are electrically erasable.

3. The method of claim 1, wherein the bus cards are modem cards, and the step of independently programming includes storing the identification in the random access memories through an AT command.

* * * * *